United States Patent
Guo

(10) Patent No.: US 12,550,181 B2
(45) Date of Patent: Feb. 10, 2026

(54) COMMUNICATION METHOD FOR WIRELESS MODE SWITCHING, ELECTRONIC DEVICE AND STORAGE MEDIUM

(71) Applicant: BEIJING XIAOMI MOBILE SOFTWARE CO., LTD., Beijing (CN)

(72) Inventor: Shengxiang Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 392 days.

(21) Appl. No.: 18/033,260

(22) PCT Filed: Oct. 22, 2020

(86) PCT No.: PCT/CN2020/122973
§ 371 (c)(1),
(2) Date: Apr. 21, 2023

(87) PCT Pub. No.: WO2022/082652
PCT Pub. Date: Apr. 28, 2022

(65) Prior Publication Data
US 2023/0397242 A1    Dec. 7, 2023

(51) Int. Cl.
| | |
|---|---|
| *H04W 72/25* | (2023.01) |
| *H04W 72/0446* | (2023.01) |
| *H04W 72/40* | (2023.01) |
| *H04W 72/56* | (2023.01) |
| *H04W 72/566* | (2023.01) |
| *H04W 76/20* | (2018.01) |
| *H04W 92/18* | (2009.01) |

(52) U.S. Cl.
CPC .......... *H04W 72/56* (2023.01); *H04W 72/25* (2023.01); *H04W 76/20* (2018.02)

(58) Field of Classification Search
CPC ...... H04W 72/56; H04W 76/20; H04W 72/25
See application file for complete search history.

(56) References Cited

U.S. PATENT DOCUMENTS

| | | | | |
|---|---|---|---|---|
| 11,375,527 | B1 * | 6/2022 | Eyuboglu | H04B 7/15528 |
| 2022/0232525 | A1 * | 7/2022 | Lee | H04W 72/20 |
| 2022/0279527 | A1 * | 9/2022 | Lee | H04W 72/56 |
| 2023/0051285 | A1 * | 2/2023 | Yang | H04W 4/40 |
| 2023/0099743 | A1 * | 3/2023 | Liu | H04W 72/044 |
| | | | | 370/329 |
| 2024/0014969 | A1 * | 1/2024 | Wang | H04W 72/0446 |

OTHER PUBLICATIONS

PCT/CN2020/122973, English translation of Search Report dated Jul. 21, 2021, 2 pages.

(Continued)

Primary Examiner — Xuan Lu
(74) Attorney, Agent, or Firm — Cozen O'Connor

(57) ABSTRACT

A communication method for wireless mode switching, performed by a terminal, includes: determining a first priority associated with an information packet of a first wireless mode and a second priority associated with an information packet of a second wireless mode; determining a target wireless mode based on the first priority and the second priority; and configuring a time domain position of a switching period within a transmission period of the target wireless mode.

17 Claims, 8 Drawing Sheets

(56) References Cited

OTHER PUBLICATIONS

Huawei et al. "WF on switching period in ITS band for NR V2X", 3GPP TSG-RAN WG4 #94-e-bis; R4-2005644; Apr./May 2020, 6 pages.
Huawei et al. "On switching period for LTE SL and NR SL", 3GPP TSG-RAN WG4 Meeting #94-e-Bis; R4-2004743; Apr. 2020, 3 pages.
OPPO "On switching period for LTE SL and NR SL", 3GPP TSG-RAN WG4 Meeting #95e; R4-2007342; May 2020, 4 pages.
Vivo "Further discussion on con-current operation for NR V2X" 3GPP TSG-RAN WG4 Meeting #96-e, R4-2010290, Aug. 2020, 5 pages.
Qualcomm "V2X TX Diversity, TX external components, Switching time between NR SL and LTE SL" 3GPP TSG-RAN WG4 Meeting #96-e, R4-2010014, 11 pages.
European Patent Application No. 20958234.5, Search and Opinion dated Jun. 6, 2024, 10 pages.

* cited by examiner

COMMUNICATION METHOD FOR WIRELESS MODE SWITCHING, ELECTRONIC DEVICE AND STORAGE MEDIUM

CROSS-REFERENCE TO RELATED APPLICATION

This application is a national phase of International Application No. PCT/CN2020/122973, filed on Oct. 22, 2020, the entire content of which is incorporated herein by reference.

TECHNICAL FIELD

The disclosure relates to the field of wireless communication technologies, and in particular, to a communication method for wireless mode switching, an electronic device and a storage medium.

BACKGROUND

The communications technology between vehicles and other devices known as Vehicle to Everything (V2X) has been vigorously developed in recent years. V2X can provide two communication interfaces in a device, called Uu interface (cellular communication interface) and PC5 interface (sidelink communication interface). V2X can provide two different wireless modes on the PC5 interface, which can be used in different service scenarios to provide rich functionality. However, a V2X terminal needs to switch between the two wireless modes. In this case, a corresponding switching period is necessary.

SUMMARY

According to a first aspect of the disclosure, a communication method for wireless mode switching is provided, the method includes: determining a first priority associated with an information packet of a first wireless mode and a second priority associated with an information packet of a second wireless mode; determining a target wireless mode based on the first priority and the second priority; and configuring a time domain position of a switching period within a transmission period of the target wireless mode.

According to a second aspect of the disclosure, an electronic device is provided, the electronic device includes: at least one processor; and a memory communicatively connected to the at least one processor; in which the memory is configured to store instructions executable by the at least one processor, and when the instructions are executed by the at least one processor, the at least one processor is enabled to perform the communication method for wireless mode switching as described in the first aspect of the disclosure.

According to a third aspect of the disclosure, a non-transitory computer-readable storage medium having stored therein computer instructions is provided. The computer instructions are configured to cause a computer to perform the communication method for wireless mode switching as described in the first aspect of the disclosure.

BRIEF DESCRIPTION OF THE DRAWINGS

These and other aspects and advantages of the disclosure will become apparent and more readily from the following descriptions made on embodiments with reference to the drawings, in which.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with embodiments of the disclosure. Instead, they are merely examples of apparatuses and methods consistent with aspects related to embodiments of the disclosure as recited in the appended claims.

The terms used in embodiments of the disclosure are only for the purpose of describing specific embodiments, and are not intended to limit embodiments of the disclosure. The singular forms of "a" and "the" used in embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in embodiments of the disclosure to describe various information, the information should not be limited to these terms. These terms are only used to distinguish the same type of information from each other. For example, without departing from the scope of embodiments of the disclosure, the first information may also be referred to as the second information, and similarly, the second information may also be referred to as the first information. Depending on the context, the word "if" as used herein can be interpreted as "when", "while" or "in response to determining".

In the related art, a method of fixing the wireless mode switching period is usually adopted. However, since the terminal may not transmit signals during the switching period, this time period belongs to the extra network overhead. In this way, a transmission quality of a carrier including the switching period may be inevitably degraded. In addition, for the wireless mode switching in which priorities of the information carried are inconsistent, the existing communication method for wireless mode switching may not reflect a difference caused by dynamic priorities.

A communication method and a communication apparatus for wireless mode switching, and an electronic device, provided in the disclosure, will be described in detail below with reference to the accompanying drawings.

Figure 1:
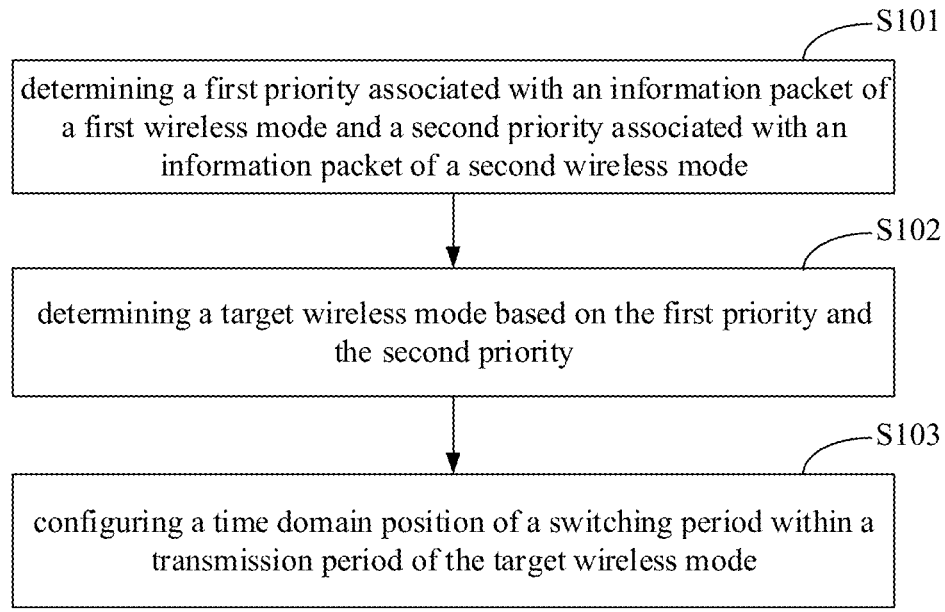
FIG. 1 is a schematic diagram of a communication method for wireless mode switching according to embodiments of the disclosure.

FIG. 1 is a schematic diagram of a communication method for wireless mode switching according to embodiments of the disclosure. It should be noted that the communication method for wireless mode switching according to the disclosure may be executed at a sending terminal of an information packet of a wireless mode.

As illustrated in FIG. 1, the communication method for wireless mode switching provided in the disclosure includes the following steps.

S101, a first priority associated with an information packet of a first wireless mode and a second priority associated with an information packet of a second wireless mode are determined.

It should be noted that V2X provides the fourth-generation (4G) communication sidelink (LTE Sidelink) based on long term evolution (LTE) technology and the new radio sidelink (NR Sidelink) of the fifth-generation (5G) mobile communication on the PC5 interface, and there are two wireless modes. LTE sidelink mainly provides basic service functions and NR Sidelink is mainly used for more advanced service scenarios.

In the disclosure, when the terminal switches between NR Sidelink and LTE Sidelink, the terminal can determine internally priority information associated with two carriers through reception, demodulation, etc., i.e., the first priority associated with the information packet of the first wireless mode and the second priority associated with the information packet of the second wireless mode.

The aforementioned first wireless mode may be NR Sidelink or LTE Sidelink, and the first wireless mode and the second wireless mode are different. For example, the first wireless mode may be NR Sidelink and the second wireless mode may be LTE Sidelink; for another example, the first wireless mode may be LTE Sidelink and the second wireless mode may be NR Sidelink.

S102, a target wireless mode is determined based on the first priority and the second priority.

Optionally, after the first priority and the second priority are determined, they are compared according to the first priority and the second priority. When it is identified that two carriers have different priorities, the wireless mode with the lower priority is determined as the target wireless mode.

For example, after obtaining the first priority and the second priority, the first priority and the second priority can be compared, and if the first priority is lower than the second priority, the wireless mode of the first priority can be determined as the target wireless mode.

Optionally, after the first priority and the second priority are determined, the target wireless mode may be determined by synthesizing the first priority and the second priority.

For example, after obtaining the first priority and the second priority, a final priority calculation result can be obtained based on a specific calculation formula involving the first priority and the second priority, and the target wireless mode can be determined according to the priority calculation result.

S103, a time domain position of a switching period is configured within a transmission period of the target wireless mode.

The transmission period may be a frame, a slot, a sub-slot, or the like.

In the disclosure, after the target wireless mode is determined, the time domain position of the switching period may be configured within the transmission period of the target wireless mode.

For example, after the wireless mode of the first priority is determined as the target wireless mode, the time domain position of the switching period can be configured within the transmission slot of the wireless mode of the first priority.

According to the communication method for wireless mode switching provided in embodiments of the disclosure, the first priority associated with the information packet of the first wireless mode and the second priority associated with the information packet of the second wireless mode are determined, the target wireless mode is determined based on the first priority and the second priority, and the time domain position of the switching period is configured within the transmission period of the target wireless mode. Therefore, the disclosure can configure the time domain position of the switching period within the transmission period of the wireless mode with the lower priority, and no longer rely on the manner of using the fixed switching period to determine the time domain position of the wireless mode switching period, which can reflect the difference caused by the dynamic priorities and avoid the degraded transmission quality caused by the additional signaling overhead occurring on the sidelink carrying important information.

It should be noted that, in practical applications, the obtained first priority and second priority may be different or the same, that is, two carriers may have different associated priorities or the same priority. Therefore, in the disclosure, when the first priority and the second priority are the same, the time domain position of the wireless mode switching period can be determined by the terminal itself.

Figure 2:
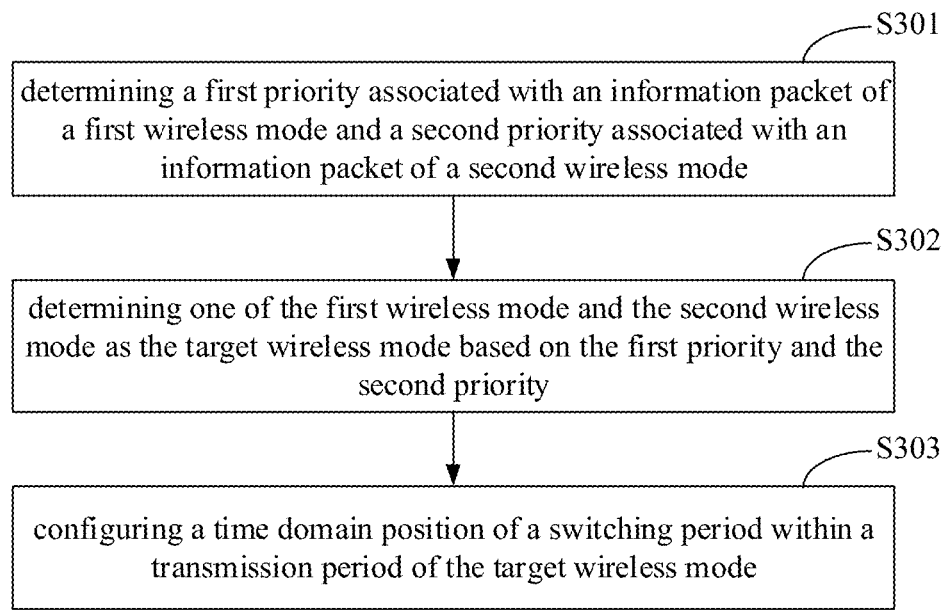
FIG. 2 is a schematic diagram of another communication method for wireless mode switching according to embodiments of the disclosure.

As a possible implementation, as illustrated in FIG. 2, the communication method for wireless mode switching proposed in the disclosure includes the following steps.

S301, a first priority associated with an information packet of a first wireless mode and a second priority associated with an information packet of a second wireless mode are determined.

Step S301 is the same as step S101 and will not be repeated herein.

S302, one of the first wireless mode and the second wireless mode is determined as the target wireless mode according to the first priority and the second priority.

In the disclosure, after the first priority and the second priority are obtained, the first priority and the second priority may be compared.

If it is identified that the first priority is higher than the second priority, it indicates that there are associated different priorities for two carriers, and the second wireless mode may be determined as the target wireless mode in response to the first priority being higher than the second priority.

If it is identified that the first priority and the second priority are the same, it indicates that there no associated different priorities for two carriers, and one of the first wireless mode and the second wireless mode is determined as the target wireless mode in response to the first priority and the second priority being the same. In this case, the first priority may be the priority associated with LTE Sidelink or may be the priority associated with NR Sidelink. The first priority is inconsistent with the second priority.

S303, a time domain position of a switching period is configured within a transmission period of the target wireless mode.

Step S303 is the same as step S103 and will not be repeated herein.

According to the communication method for wireless mode switching provided in embodiments of the disclosure, the first priority associated with the information packet of the first wireless mode and the second priority associated with the information packet of the second wireless mode are determined, one of the first wireless mode and the second wireless mode is determined as the target wireless mode when it is identified that the first priority and the second priority are the same, and the time domain position of the switching period is configured within the transmission period of the target wireless mode. Therefore, in the disclosure, when the first priority and the second priority are the same, the terminal can decide by itself to place the switching period within the transmission period of any one of the first wireless mode and the second wireless mode, which improves the effectiveness and reliability in the communication process of wireless mode switching.

It should be noted that, in practical applications, there is a situation that there is a failure of obtaining the first priority or the second priority, that is, there is a situation in which the terminal does not obtain complete priorities associated with two carriers before switching. Therefore, in the disclosure, when any one of the first priority and the second priority fails to be obtained, the terminal can determine the time domain position of the wireless mode switching period by itself.

Figure 3:
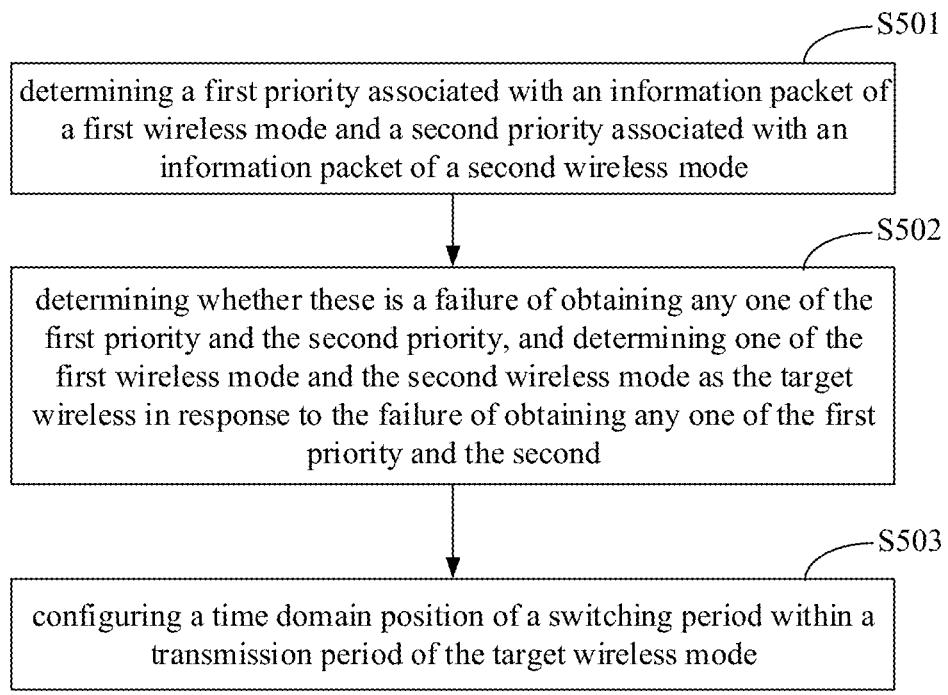
FIG. 3 is a schematic diagram of another communication method for wireless mode switching according to embodiments of the disclosure.

As a possible implementation, as illustrated in FIG. 3, the communication method for wireless mode switching proposed in the disclosure includes the following steps.

S501, a first priority associated with an information packet of a first wireless mode and a second priority associated with an information packet of a second wireless mode are determined.

Step S501 is the same as step S101 and will not be repeated herein.

S502, it is determined whether there is a failure of obtaining any one of the first priority and the second priority, and when it is identified that there is the failure of obtaining any one of the first priority and the second priority, one of the first wireless mode and the second wireless mode is determined as the target wireless mode.

The failure of obtaining refers to the situation in which the priority information is not obtained or the complete priority information is not obtained.

In the disclosure, after obtaining the first priority and the second priority, it can be determined whether there is the failure of obtaining any one of the first priority and the second priority, and after identifying there is the failure of obtaining any one of the first priority and the second priority, the wireless mode with a success of obtaining may be determined as the target wireless mode, that is, one of the first wireless mode and the second wireless mode may be determined as the target wireless mode.

For example, if the first priority fails to be obtained, the second wireless mode with the success of obtaining may be determined as the target wireless mode.

S503, a time domain position of a switching period is configured within a transmission period of the target wireless mode.

Step S503 is the same as step S103 and will not be repeated herein.

According to the communication method for wireless mode switching provided in embodiments of the disclosure, the first priority associated with the information packet of the first wireless mode and the second priority associated with the information packet of the second wireless mode are determined, and it is determined whether there is the failure of obtaining any one of the first priority and the second priority, and when it is identified that there is the failure of obtaining any one of the first priority and the second priority, one of the first wireless mode and the second wireless mode is determined as the target wireless mode, and the time domain position of the switching period is configured within the transmission period of the target wireless mode. Therefore, the disclosure can determine the wireless mode with the success of obtaining as the target wireless mode when there is the failure of obtaining any one of the first priority and the second priority, avoiding the problem of not effectively determining the time domain position of the wireless mode switching period when there is the failure of obtaining any one of the first priority and the second priority, and improving improves the effectiveness and reliability in the communication process of wireless mode switching.

It should be noted that, in the disclosure, after the target wireless mode is determined, an aligning manner of the switching period may be determined according to the target wireless mode and the current wireless mode. The current wireless mode refers to the wireless communication mode in which the device is currently located, that is, the wireless mode before the wireless mode switching.

Figure 4:
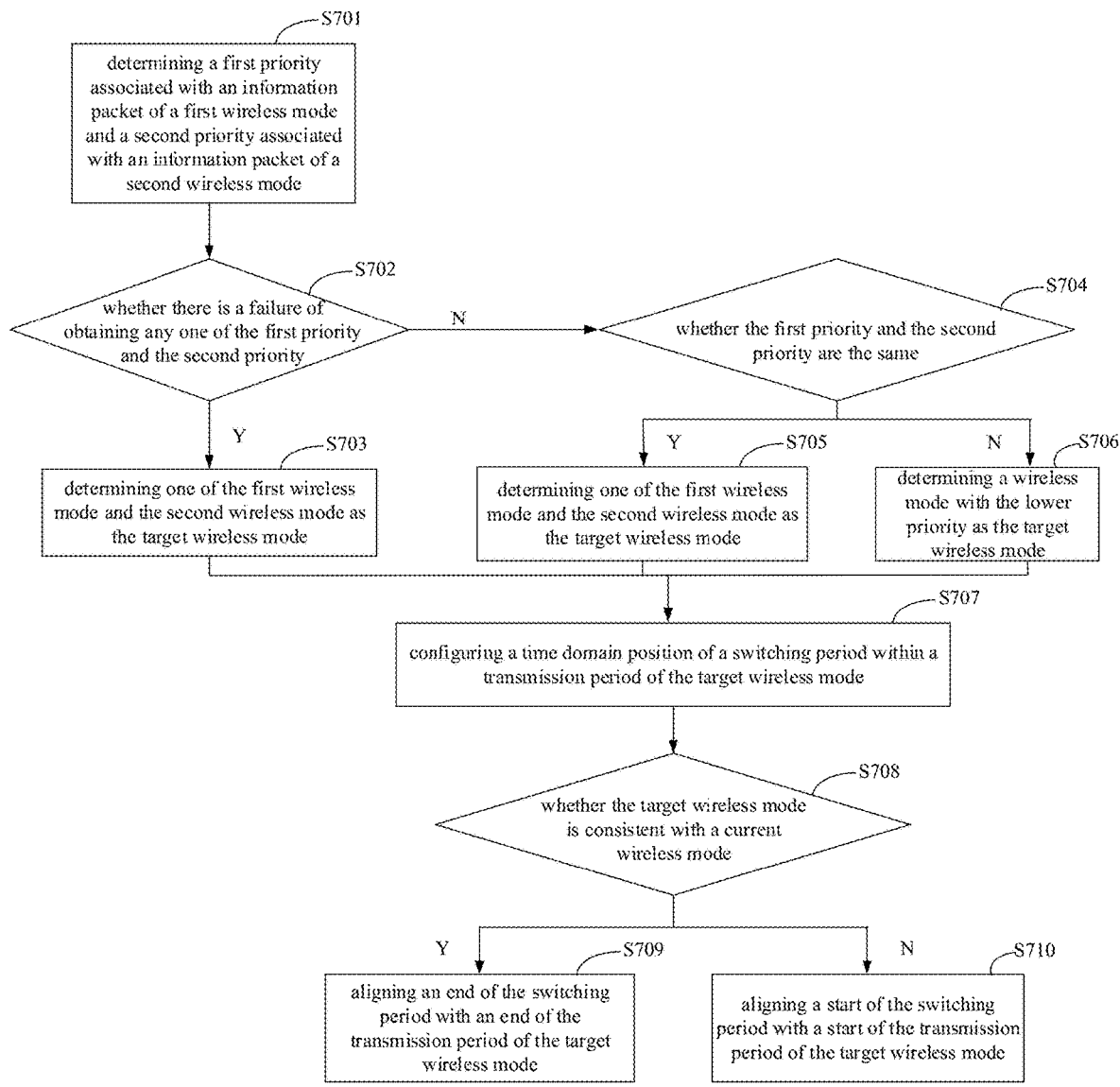
FIG. 4 is a schematic diagram of another communication method for wireless mode switching according to embodiments of the disclosure.

As a possible implementation, as illustrated in FIG. 4, the communication method for wireless mode switching proposed in the disclosure includes the following steps.

S701, a first priority associated with an information packet of a first wireless mode and a second priority associated with an information packet of a second wireless mode are determined.

S702, it is determined whether there is a failure of obtaining any one of the first priority and the second priority.

Optionally, when it is identified that there is the failure of obtaining any one of the first priority and the second priority, step S703 may be performed; when it is identified that the first priority and the second priority are obtained successfully, step S704 may be performed.

S703, one of the first wireless mode and the second wireless mode is determined as the target wireless mode.

S704, it is determined whether the first priority and the second priority are the same.

Optionally, when it is determined that the first priority and the second priority are the same, step S705 may be performed; when it is determined that the first priority and the second priority are not the same, step S706 may be performed.

S705, one of the first wireless mode and the second wireless mode is determined as the target wireless mode.

S706, a wireless mode with the lower priority is determined as the target wireless mode.

S707, a time domain position of a switching period is configured within a transmission period of the target wireless mode.

It should be noted that, after completing any one of steps S703, S705 and S706, step S707 may be executed.

For the implementation process of the foregoing steps S701 to S707, reference may be made to the relevant content in the above description of the communication method for wireless mode switching, which will not be repeated herein.

S708, it is determined whether the target wireless mode is consistent with a current wireless mode.

Optionally, when it is determined that the target wireless mode is consistent with the current wireless mode, step S709 may be executed; when it is determined that the target wireless mode is inconsistent with the current wireless mode, step S710 may be executed.

For example, if the obtained target wireless mode is NR Sidelink and the current wireless mode is NR Sidelink, in this case, it is identified that the target wireless mode is consistent with the current wireless mode, and step S709 can be executed; if the obtained target wireless mode is NR Sidelink and the current wireless mode is LTE Sidelink, in this case, it is identified that the target wireless mode is inconsistent with the current wireless mode, step S710 may be performed.

S709, an end of the switching period is aligned with an end of the transmission period of the target wireless mode.

Figure 5:
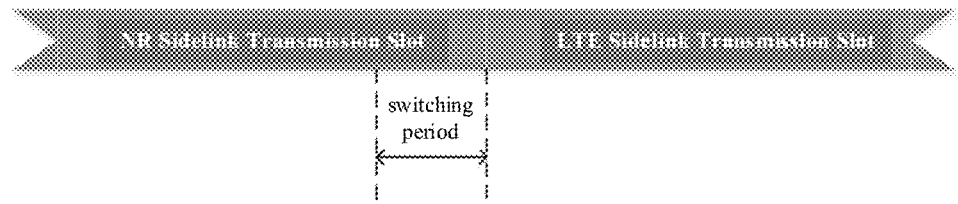
FIG. 5 is a schematic diagram of an aligning manner of a switching period according to embodiments of the disclosure.

For example, as illustrated in FIG. 5, if it is identified that the target wireless mode and the current wireless mode are both NR Sidelink, that is, the target wireless mode is consistent with the current wireless mode, the end of the switching period can be aligned with the end of the NR Sidelink transmission period.

S710, a start of the switching period is aligned with a start of the transmission period of the target wireless mode.

Figure 6:
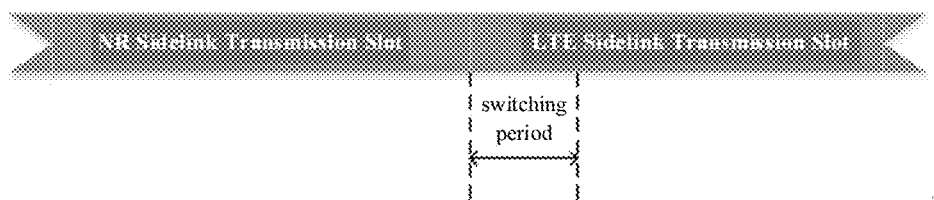
FIG. 6 is a schematic diagram of another aligning manner of a switching period according to embodiments of the disclosure.

For example, as illustrated in FIG. 6, if it is identified that the target wireless mode is LTE Sidelink and the current wireless mode is NR Sidelink, that is, the target wireless mode is inconsistent with the current wireless mode, the start of the switching period can be aligned with the start of the transmission period of LTE Sidelink.

It should be noted that the aforementioned aligning manner of the switching period is also applicable to multiple processes of wireless mode switching.

Figure 7:
FIGS. 7(a) and 7(b) are schematic diagrams of another aligning manner of a switching period according to embodiments of the disclosure.
Figure 7:

For example, the priority of NR Sidelink is lower. In this case, when switching from NR Sidelink to LTE Sidelink, and then switching from LTE Sidelink to NR Sidelink, the aligning manner of the switching period is illustrated in FIG. 7(*a*).

For another example, the priority of LTE Sidelink is lower. In this case, when switching from NR Sidelink to LTE Sidelink, and then switching from LTE Sidelink to NR Sidelink, the aligning manner of the switching period is illustrated in FIG. 7(*b*).

According to the communication method for wireless mode switching provided in embodiments of the disclosure, the first priority associated with the information packet of the first wireless mode and the second priority associated with the information packet of the second wireless mode are determined, and it is determined whether there is the failure of obtaining any one of the first priority and the second priority, and when it is identified that there is the failure of obtaining any one of the first priority and the second priority, one of the first wireless mode and the second wireless mode is determined as the target wireless mode, and the time domain position of the switching period is configured within the transmission period of the target wireless mode. Therefore, the disclosure can determine the wireless mode with the success of obtaining as the target wireless mode when there is the failure of obtaining any one of the first priority and the second priority, avoiding the problem of not effectively determining the time domain position of the wireless mode switching period when there is the failure of obtaining any one of the first priority and the second priority, and improving improves the effectiveness and reliability in the communication process of wireless mode switching.

It should be noted that, in the disclosure, when trying to determine and obtain the first priority associated with the information packet of the first wireless mode and the second priority associated with the information packet of the second wireless mode, the first priority and the second priority may be obtained by demodulating sidelink control information.

Figure 8:
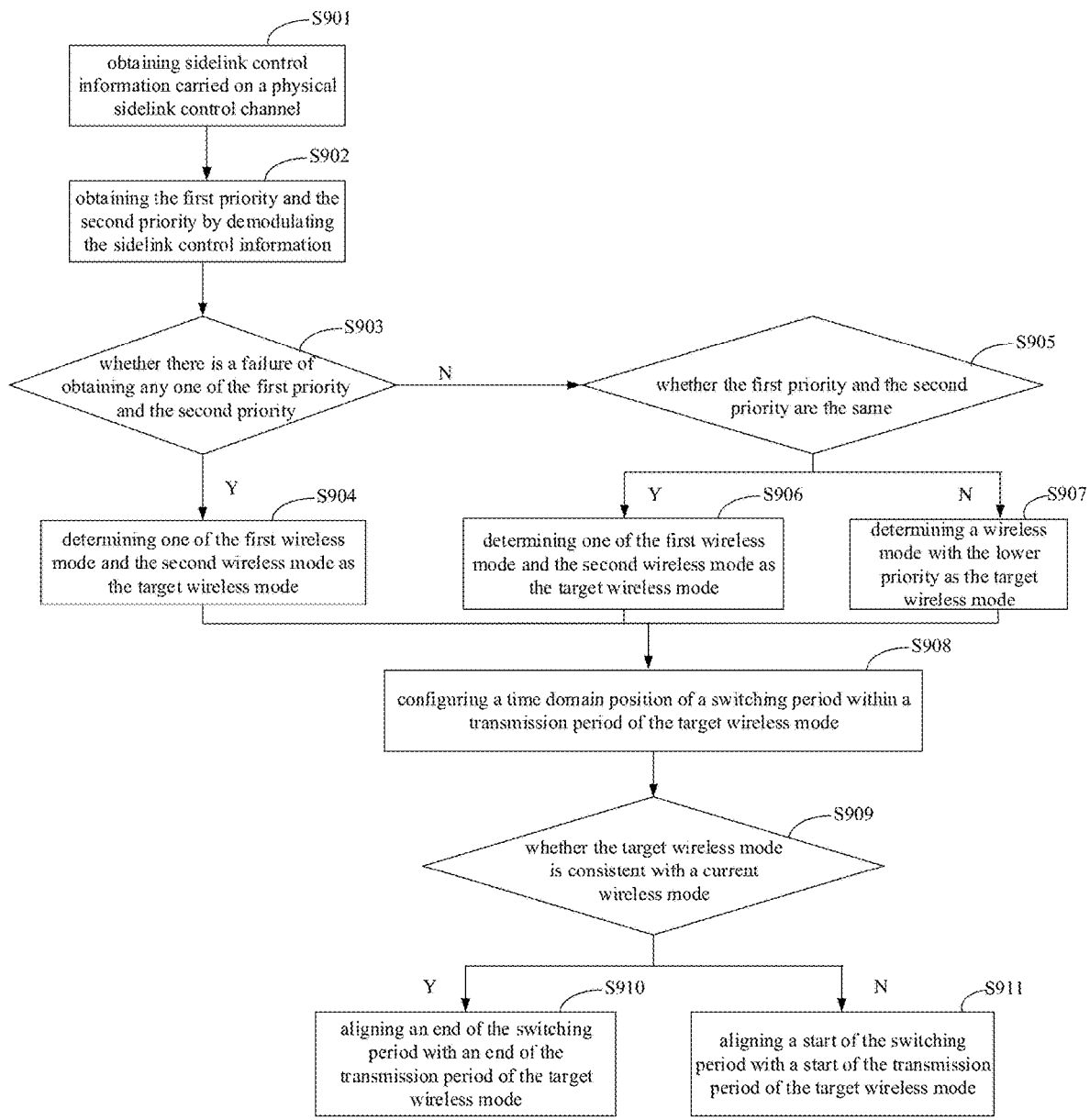
FIG. 8 is a flowchart of a communication method for wireless mode switching according to embodiments of the disclosure.

As a possible implementation, as illustrated in FIG. 8, the communication method for wireless mode switching proposed in the disclosure includes the following steps.

S901, sidelink control information (SCI) carried on a physical sidelink control channel (PSCCH) is obtained.

In the disclosure, during the sidelink communication process, the terminal can receive the sidelink control information and communication data carried on the physical sidelink control channel sent by the transmitter such as the in-vehicle device. The SCI can be used to decode communication data.

S902, the first priority and the second priority are obtained by demodulating the sidelink control information.

Optionally, after obtaining the SCI carried on the physical sidelink control channel, the terminal can internally demodulate the SCI carried on the physical sidelink control channel to obtain the priority information associated with two carriers, that is, the first priority associated with the information packet of the first wireless mode and the second priority associated with the information packet of the second wireless mode.

S903, it is determined whether there is a failure of obtaining any one of the first priority and the second priority.

Optionally, when it is identified that there is the failure of obtaining any one of the first priority and the second priority, step S904 may be performed; when it is identified that the first priority and the second priority are obtained successfully, step S905 may be performed.

S904, one of the first wireless mode and the second wireless mode is determined as the target wireless mode.

S905, it is determined whether the first priority and the second priority are the same.

Optionally, when it is determined that the first priority and the second priority are the same, step S906 may be performed; when it is determined that the first priority and the second priority are not the same, step S907 may be performed.

S906, one of the first wireless mode and the second wireless mode is determined as the target wireless mode.

S907, a wireless mode with the lower priority is determined as the target wireless mode.

S908, a time domain position of a switching period is configured within a transmission period of the target wireless mode.

It should be noted that, after completing any one of steps S904, S906 and S907, step S908 may be executed.

For the implementation process of the foregoing steps S903 to S908, reference may be made to the relevant content in the above description of the communication method for wireless mode switching, which will not be repeated herein.

S909, it is determined whether the target wireless mode is consistent with a current wireless mode.

S910, an end of the switching period is aligned with an end of the transmission period of the target wireless mode.

S911, a start of the switching period is aligned with a start of the transmission period of the target wireless mode.

It should be noted that if the receiving terminal is a device that only supports a unique wireless mode, for example if the sending terminal switches from wireless mode 1 to wireless mode 2, the receiving terminal changes from a wireless mode 1 device to a wireless mode 2 device. At this time, the receiving terminal (the wireless mode 1 device, the wireless mode 2 device) does not need to execute the communication method for wireless mode switching proposed in the disclosure, and can only receive wireless mode information packets consistent with its own wireless mode.

If the receiving terminal is a device that can support two wireless modes, that is, LTE Sidelink wireless mode and NR Sidelink wireless mode, the receiving terminal can execute the communication method for wireless mode switching proposed in the disclosure to determine the time domain position of the switching period switch and to switch according to the determined time domain position of the switching period; and also to switch according to the preset time domain position of the switching period from the sending terminal.

According to the communication method for wireless mode switching provided in embodiments of the disclosure, when trying to determine the first priority associated with the information packet of the first wireless mode and the second priority associated with the information packet of the second wireless mode, the SCI carried on the PSCCH is obtained and the SCI is demodulated to obtain the first priority and the second priority, the target wireless mode is determined based on the first priority and the second priority, and the time domain position of the switching period is configured within the transmission period of the target wireless mode, and it no longer relies on the manner of using the fixed switching period to determine the time domain position of the wireless mode switching period, which can reflect the difference caused by the dynamic priorities and avoid the degraded transmission quality caused by the additional signaling overhead occurring on the sidelink carrying important information.

Figure 9:
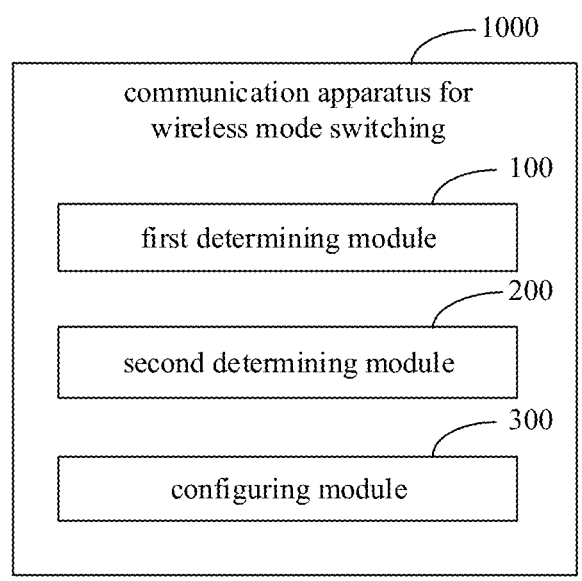
FIG. 9 is a schematic diagram of another communication apparatus for wireless mode switching according to embodiments of the disclosure.
Figure 10:
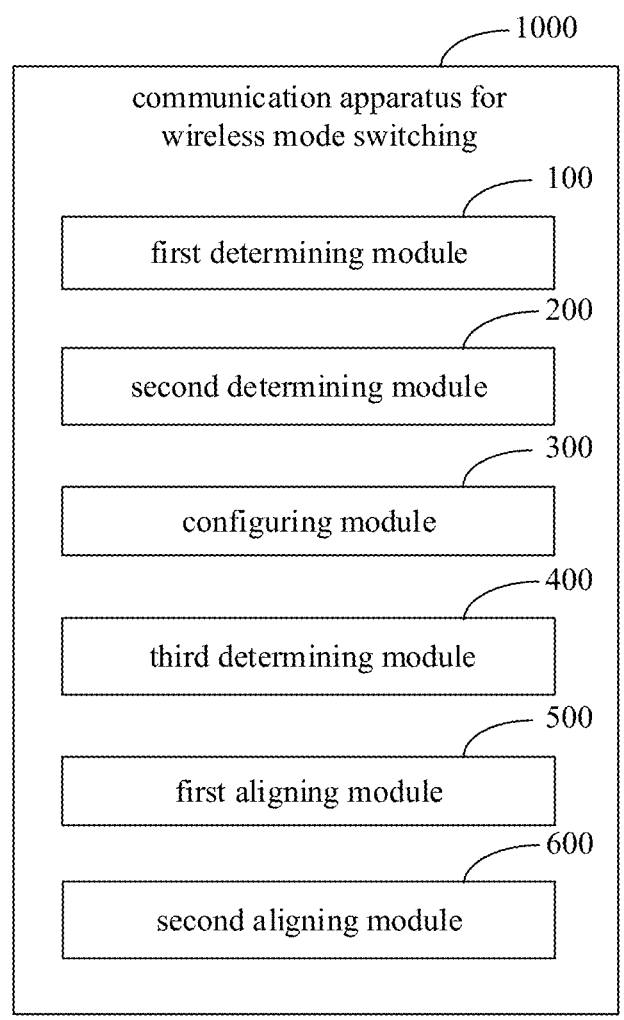
FIG. 10 is a schematic diagram of another communication apparatus for wireless mode switching according to embodiments of the disclosure.
Figure 11:
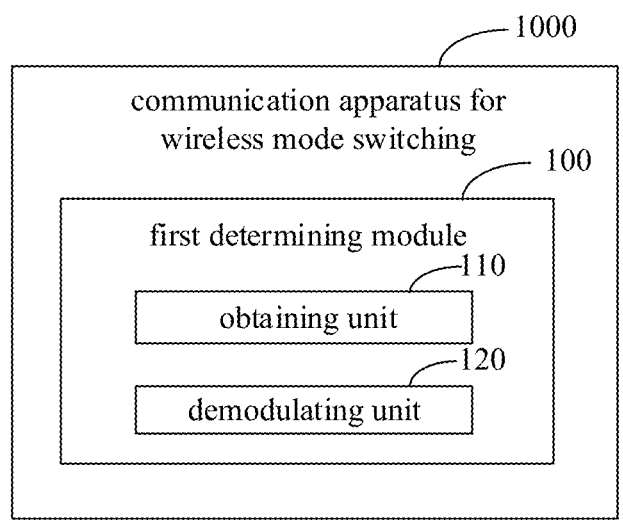
FIG. 11 is a schematic diagram of another communication apparatus for wireless mode switching according to embodiments of the disclosure.

Corresponding to the communication method for wireless mode switching provided in the above-mentioned embodiments, the disclosure further provides a communication apparatus for wireless mode switching. Because the communication apparatus for wireless mode switching provided in some embodiments of the disclosure is corresponding to the communication method for wireless mode switching provided in the above-mentioned embodiments, the implementation of the communication method for wireless mode switching is also applicable to the communication apparatus for wireless mode switching provided in some embodiments, and the same part is not described in detail in some embodiments. FIG. 9 to FIG. 11 are schematic structural diagrams of a communication apparatus for wireless mode switching proposed according to the disclosure.

As illustrated in FIG. 9, the communication apparatus 1000 for wireless mode switching includes a first determining module 100, a second determining module 200 and a configuring module 300.

The first determining module 100 is configured to determine a first priority associated with an information packet of a first wireless mode and a second priority associated with an information packet of a second wireless mode.

The second determining module 200 is configured to determine a target wireless mode based on the first priority and the second priority.

The configuring module 300 is configured to configure a time domain position of a switching period within a transmission period of the target wireless mode.

In some embodiments of the disclosure, as illustrated in FIG. 10, the second determining module 200 is configured to: in response to the first priority being higher than the second priority, determine the second wireless mode as the target wireless mode; or in response to the first priority and the second priority being the same, determine one of the first wireless mode and the second wireless mode as the target wireless mode.

In some embodiments of the disclosure, as illustrated in FIG. 10, the communication apparatus 1000 for wireless mode switching further includes a third determining module 400.

The third determining module 400 is configured to, in response to a failure of obtaining any one of the first priority and the second priority, determine one of the first wireless mode and the second wireless mode as the target wireless mode.

In some embodiments of the disclosure, as illustrated in FIG. 10, the communication apparatus 1000 for wireless mode switching further includes a first aligning module 500.

The first aligning module 500 is configured to, in response to identifying that the target wireless mode is consistent with a current wireless mode, align an end of the switching period with an end of the transmission period of the target wireless mode.

In some embodiments of the disclosure, as illustrated in FIG. 10, the communication apparatus 1000 for wireless mode switching further includes a second aligning module 600.

The second aligning module 600 is configured to, in response to identifying that the target wireless mode is inconsistent with a current wireless mode, align a start of the switching period with a start of the transmission period of the target wireless mode.

In some embodiments of the disclosure, as illustrated in FIG. 11, the first determining module 100 in FIG. 9 includes an obtaining unit 110 and a demodulating unit 120.

The obtaining unit 110 is configured to obtain sidelink control information carried on a physical sidelink control channel.

The demodulating unit 120 is configured to obtain the first priority and the second priority by demodulating the sidelink control information.

According to the communication apparatus for wireless mode switching according to the embodiments of the disclosure, the first priority associated with the information packet of the first wireless mode and the second priority associated with the information packet of the second wireless mode are determined, the target wireless mode is determined based on the first priority and the second priority, and the time domain position of the switching period is configured within the transmission period of the target wireless mode. Therefore, the disclosure can configure the time domain position of the switching period within the transmission period of the wireless mode with the lower priority, and no longer rely on the manner of using the fixed switching period to determine the time domain position of the wireless mode switching period, which can reflect the difference caused by the dynamic priorities and avoid the degraded transmission quality caused by the additional signaling overhead occurring on the sidelink carrying important information.

According to embodiments of the disclosure, the disclosure further provides an electronic device and a readable storage medium.

Figure 12:
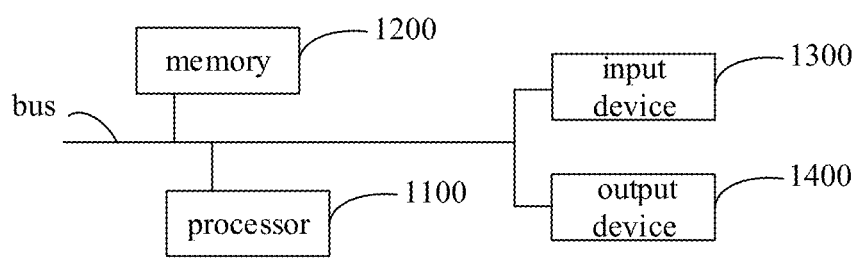
FIG. 12 is a schematic diagram of an electronic device according to embodiments of the disclosure.

As illustrated in FIG. 12, it is a block diagram of an electronic device for communication of wireless mode switching according to some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 12, the electronic device includes: one or more processors 1100, a memory 1200, and interfaces for connecting various components, including a high-speed interface and a low-speed interface. Various components are connected to each other by different buses, and may be installed on a common main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides some necessary operations (for example, as a server array, a group of blade servers, or a multiprocessor system). In FIG. 12, a processor 1100 is taken as an example.

The memory 1200 is a non-transitory computer readable storage medium provided by the disclosure. The memory is configured to store instructions executed by at least one processor, to enable the at least one processor to execute the communication method for wireless mode switching according to the disclosure. The non-transitory computer readable storage medium according to the disclosure is configured to store computer instructions. The computer instructions are configured to enable a computer to execute the communication method for wireless mode switching according to the disclosure.

As the non-transitory computer readable storage medium, the memory 1200 may be configured to store non-transitory software programs, non-transitory computer executable programs and modules, such as program instructions/modules (such as, the first determining module 100, the second determining module 200, and the configuring module 300 illustrated in FIG. 9) corresponding to the communication method for wireless mode switching according to embodiments of the disclosure. The processor 1100 is configured to execute various functional applications and data processing by operating non-transitory software programs, instructions and modules stored in the memory 1200, that is, implements the communication method for wireless mode switching according to the above method embodiments.

The memory 1200 may include a storage program region and a storage data region. The storage program region may store an application required by an operating system and at least one function. The storage data region may store data created according to usage of the electronic device. In addition, the memory 1200 may include a high-speed random-access memory, and may also include a non-transitory memory, such as at least one disk memory device, a flash memory device, or other non-transitory solid-state memory device. In some embodiments, the memory 1200 may alternatively include memories remotely located to the processor 1100, and these remote memories may be connected to the electronic device through a network. Examples of the above network include, but are not limited to, an Internet, an intranet, a local area network, a mobile communication network and combinations thereof.

The electronic device used for wireless mode switching communication may further include: an input device 1300 and an output device 1400. The processor 1100, the memory 1200, the input device 1300, and the output device 1400 may be connected through a bus or in other means. In FIG. 11, the bus is taken as an example.

The input device 1300 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 1400 may include a display device, an auxiliary lighting device (e.g., LED), a haptic feedback device (such as, a vibration motor), and the like. The display device may include, but be not limited to, a liquid crystal display (LCD), a light emitting diode (LED) display, and a plasma display. In some embodiments, the display device may be the touch screen.

The various implementations of the system and techniques described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general-purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with the user, the system and techniques described herein may be implemented on a computer. The computer has a display device (such as, a CRT (cathode ray tube) or an LCD (liquid crystal display) monitor) for displaying information to the user, a keyboard and a pointing device (such as, a mouse or a trackball), through which the user may provide the input to the computer. Other types of apparatus may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and techniques described herein may be implemented in a computing system (such as, a data server) including a background component, a computing system (such as, an application server) including a middleware component, or a computing system including a front-end component (such as, a user computer having a graphical user interface or a web browser, through which the user may interact with embodiments of the system and techniques described herein), or a computing system including any combination of the background component, the middleware components, or the front-end component. Components of the system may be connected to each other through digital data communication in any form or medium (such as, a communication network). Examples of the communication network include a local area network (LAN), a wide area networks (WAN), the Internet, and a blockchain network.

The computer system may include a client and a server. The client and the server are generally remote from each other and usually interact through the communication network. A relationship between the client and the server is generated by computer programs operated on a corresponding computer and having a client-server relationship with each other.

According to the communication method for wireless mode switching provided in embodiments of the disclosure, the first priority associated with the information packet of the first wireless mode and the second priority associated with the information packet of the second wireless mode are determined, the target wireless mode is determined based on the first priority and the second priority, and the time domain position of the switching period is configured within the transmission period of the target wireless mode. Therefore, the disclosure can configure the time domain position of the switching period within the transmission period of the wireless mode with the lower priority, and no longer rely on the manner of using the fixed switching period to determine the time domain position of the wireless mode switching period, which can reflect the difference caused by the dynamic priorities and avoid the degraded transmission quality caused by the additional signaling overhead occurring on the sidelink carrying important information.

It should be understood that, steps may be reordered, added or deleted by utilizing flows in the various forms illustrated above. For example, the steps described in the disclosure may be executed in parallel, sequentially or in different orders, so long as a desired result of the technical solution disclosed in the disclosure may be achieved, there is no limitation here.

The above detailed implementation does not limit the protection scope of the disclosure. It should be understood by the skilled in the art that, various modifications, combinations, sub-combinations and substitutions may be made based on design requirements and other factors. Any modification, equivalent substitution and improvement made within the spirit and principle of the disclosure shall be included in the protection scope of disclosure.

What is claimed is:

1. A communication method for wireless mode switching, performed by a terminal, comprising:
   determining a first priority associated with an information packet of a first wireless mode and a second priority associated with an information packet of a second wireless mode;
   determining a target wireless mode based on the first priority and the second priority; and
   configuring a time domain position of a switching period within a transmission period of the target wireless mode;
   wherein determining the target wireless mode comprises:
   in response to the first priority and the second priority being the same, determining one of the first wireless mode and the second wireless mode as the target wireless mode.

2. The method as claimed in claim 1, further comprising:
   in response to a failure of determining any one of the first priority and the second priority, determining one of the first wireless mode and the second wireless mode as the target wireless mode.

3. The method as claimed in claim 1, further comprising:
   in response to identifying that the target wireless mode is consistent with a current wireless mode, aligning an end of the switching period with an end of the transmission period of the target wireless mode.

4. The method as claimed in claim 1, further comprising:
   in response to identifying that the target wireless mode is inconsistent with a current wireless mode, aligning a start of the switching period with a start of the transmission period of the target wireless mode.

5. The method as claimed in claim 1, wherein determining the first priority associated with the information packet of the first wireless mode and the second priority associated with the information packet of the second wireless mode comprises:
   obtaining sidelink control information carried on a physical sidelink control channel; and
   obtaining the first priority and the second priority by demodulating the sidelink control information.

6. The method as claimed in claim 1, further comprising:
   in response to a failure of determining any one of the first priority and the second priority, determining a wireless mode in the first and the second wireless mode, which is corresponding to a success of obtaining the priority, as the target wireless mode.

7. An electronic device, comprising:
   a processor; and
   a memory communicatively connected to the processor;
   wherein,
   the memory is configured to store instructions executable by the processor, and the processor is configured to execute the instructions to:
   determine a first priority associated with an information packet of a first wireless mode and a second priority associated with an information packet of a second wireless mode;
   determine a target wireless mode based on the first priority and the second priority; and
   configure a time domain position of a switching period within a transmission period of the target wireless mode;
   wherein the processor is further configured to execute the instructions to:
   in response to the first priority and the second priority being the same, determine one of the first wireless mode and the second wireless mode as the target wireless mode.

8. The electronic device as claimed in claim 7, wherein the processor is configured to execute the instructions to:

in response to a failure of obtaining any one of the first priority and the second priority, determine one of the first wireless mode and the second wireless mode as the target wireless mode.

9. The electronic device as claimed in claim 7, wherein the processor is configured to execute the instructions to:
in response to identifying that the target wireless mode is consistent with a current wireless mode, align an end of the switching period with an end of the transmission period of the target wireless mode.

10. The electronic device as claimed in claim 7, wherein the processor is configured to execute the instructions to:
in response to identifying that the target wireless mode is inconsistent with a current wireless mode, align a start of the switching period with a start of the transmission period of the target wireless mode.

11. The electronic device as claimed in claim 7, wherein the processor is configured to execute the instructions to:
obtain sidelink control information carried on a physical sidelink control channel; and
obtain the first priority and the second priority by demodulating the sidelink control information.

12. The electronic device as claimed in claim 7, wherein the processor is configured to execute the instructions to:
in response to a failure of obtaining any one of the first priority and the second priority, determine a wireless mode in the first and the second wireless mode, which is corresponding to a success of obtaining the priority, as the target wireless mode.

13. A non-transitory computer-readable storage medium having stored therein computer instructions that are configured to cause a computer to perform a communication method for wireless mode switching, the method comprising:
determining a first priority associated with an information packet of a first wireless mode and a second priority associated with an information packet of a second wireless mode;
determining a target wireless mode based on the first priority and the second priority; and
configuring a time domain position of a switching period within a transmission period of the target wireless mode;
wherein the method further comprises:
in response to the first priority and the second priority being the same, determining one of the first wireless mode and the second wireless mode as the target wireless mode.

14. The non-transitory computer-readable storage medium as claimed in claim 13, wherein the method further comprises:
in response to a failure of obtaining any one of the first priority and the second priority, determining one of the first wireless mode and the second wireless mode as the target wireless mode.

15. The non-transitory computer-readable storage medium as claimed in claim 13, wherein the method further comprises:
in response to identifying that the target wireless mode is consistent with a current wireless mode, aligning an end of the switching period with an end of the transmission period of the target wireless mode.

16. The non-transitory computer-readable storage medium as claimed in claim 13, wherein the method further comprises:
in response to identifying that the target wireless mode is inconsistent with a current wireless mode, aligning a start of the switching period with a start of the transmission period of the target wireless mode.

17. The non-transitory computer-readable storage medium as claimed in claim 13, wherein determining the first priority associated with the information packet of the first wireless mode and the second priority associated with the information packet of the second wireless mode comprises:
obtaining sidelink control information carried on a physical sidelink control channel; and
obtaining the first priority and the second priority by demodulating the sidelink control information.

* * * * *